(12) United States Patent
Kiel et al.

(10) Patent No.: US 8,296,738 B1
(45) Date of Patent: Oct. 23, 2012

(54) METHODS AND SYSTEMS FOR IN-PLACE SHADER DEBUGGING AND PERFORMANCE TUNING

(75) Inventors: Jeffrey T. Kiel, Raleigh, NC (US); Derek M. Cornish, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1421 days.

(21) Appl. No.: 11/838,184

(22) Filed: Aug. 13, 2007

(51) Int. Cl.
G06F 9/44 (2006.01)
G06F 9/45 (2006.01)

(52) U.S. Cl. .......... 717/127; 717/125; 717/140

(58) Field of Classification Search .......... None
See application file for complete search history.

(56) References Cited

U.S. PATENT DOCUMENTS

| | | | |
|---|---|---|---|
| 5,752,062 A | 5/1998 | Gover et al. | |
| 5,757,919 A | 5/1998 | Herbert et al. | |
| 5,815,154 A | 9/1998 | Hirschtick et al. | |
| 5,978,484 A | 11/1999 | Apperson et al. | |
| 6,016,474 A | 1/2000 | Kim et al. | |
| 6,157,618 A | 12/2000 | Boss et al. | |
| 6,330,008 B1 | 12/2001 | Razdow et al. | |
| 6,362,825 B1 | 3/2002 | Johnson | |
| 6,668,325 B1 | 12/2003 | Collberg et al. | |
| 6,732,060 B1 | 5/2004 | Lee | |
| 6,901,582 B1 | 5/2005 | Harrison | |
| 6,943,800 B2 | 9/2005 | Taylor et al. | |
| 7,015,909 B1 * | 3/2006 | Morgan, III et al. | 345/426 |
| 7,016,972 B2 | 3/2006 | Bertram et al. | |
| 7,047,519 B2 | 5/2006 | Bates et al. | |
| 7,095,416 B1 * | 8/2006 | Johns et al. | 345/522 |
| 7,107,484 B2 | 9/2006 | Yamazaki et al. | |
| 7,173,635 B2 | 2/2007 | Amann et al. | |
| 7,237,151 B2 | 6/2007 | Swoboda et al. | |
| 7,260,066 B2 | 8/2007 | Wang et al. | |
| 7,277,826 B2 | 10/2007 | Castelli et al. | |
| 7,395,426 B2 | 7/2008 | Lee et al. | |
| 7,420,563 B2 | 9/2008 | Wakabayashi | |
| 7,426,724 B2 * | 9/2008 | Kilgard et al. | 717/151 |
| 7,505,953 B2 | 3/2009 | Doshi | |
| 7,511,712 B1 * | 3/2009 | Johns et al. | 717/127 |
| 7,548,244 B2 * | 6/2009 | Heirich | 345/501 |
| 7,555,499 B2 | 6/2009 | Shah et al. | |
| 7,600,155 B1 * | 10/2009 | Nickolls et al. | 714/38 |

(Continued)

OTHER PUBLICATIONS

NVIDIA, "GPU Programming Guide—GeForce 8 and 9 Series", Dec. 19, 2008, NVIDIA Corporation, pp. 1-65 <http://developerdownload.nvidia.com/GPU_Programming_Guide/GPU_Programming_Guide_G80.pdf>.*

Duca et al., "A Relational Debugging Engine for the Graphics Pipeline", Jul. 2005 ACM, vol. 24, Issue 3, pp. 453-463 <http://dl.acm.org/citation.cfm?doid=1186822.1073213>.*

(Continued)

*Primary Examiner* — Thuy Dao
*Assistant Examiner* — Ben C Wang
(74) *Attorney, Agent, or Firm* — Patterson & Sheridan, LLP

(57) ABSTRACT

One embodiment of the present invention sets forth a system that allows a software developer to perform shader debugging and performance tuning. The system includes an interception layer between the software application and the application programming interface (API). The interception layer is configured to intercept and store source code versions of the original shaders included in the application. For each object in the frame, the interception layer makes shader source code available to the developer, so that the developer can modify the source code as needed, re-compile only the modified shader source code, and run the application. Consequently, shader debugging and performance tuning may be carried out in a manner that is more efficient and effective relative to prior art approaches.

22 Claims, 6 Drawing Sheets

U.S. PATENT DOCUMENTS

| | | | |
|---|---|---|---|
| 7,661,093 B2* | 2/2010 | Minadakis | 717/140 |
| 7,750,913 B1* | 7/2010 | Parenteau et al. | 345/502 |
| 8,006,236 B1* | 8/2011 | Kilgard et al. | 717/136 |
| 8,159,491 B2* | 4/2012 | Capewell et al. | 717/127 |
| 2001/0044928 A1 | 11/2001 | Akaike et al. | |
| 2003/0043022 A1 | 3/2003 | Burgan et al. | |
| 2004/0085894 A1 | 5/2004 | Wang et al. | |
| 2004/0130552 A1 | 7/2004 | Duluk et al. | |
| 2005/0222881 A1 | 10/2005 | Booker | |
| 2005/0243094 A1 | 11/2005 | Patel et al. | |
| 2005/0273652 A1 | 12/2005 | Okawa et al. | |
| 2005/0278684 A1 | 12/2005 | Hamilton et al. | |
| 2006/0005178 A1* | 1/2006 | Kilgard et al. | 717/153 |
| 2006/0059468 A1* | 3/2006 | Heirich | 717/125 |
| 2006/0071933 A1* | 4/2006 | Green et al. | 345/426 |
| 2006/0080625 A1 | 4/2006 | Bose et al. | |
| 2006/0082577 A1* | 4/2006 | Carter | 345/426 |
| 2006/0109846 A1 | 5/2006 | Lioy et al. | |
| 2006/0152509 A1* | 7/2006 | Heirich | 345/426 |
| 2006/0161761 A1 | 7/2006 | Schwartz et al. | |
| 2006/0185017 A1 | 8/2006 | Challener et al. | |
| 2007/0018980 A1* | 1/2007 | Berteig et al. | 345/426 |
| 2007/0115292 A1 | 5/2007 | Brothers et al. | |
| 2007/0274284 A1 | 11/2007 | Dendukuri et al. | |
| 2008/0007563 A1 | 1/2008 | Aronson et al. | |
| 2008/0095090 A1 | 4/2008 | Lee et al. | |
| 2009/0089763 A1* | 4/2009 | Chen et al. | 717/140 |
| 2009/0189897 A1* | 7/2009 | Abbas | 345/426 |
| 2010/0149185 A1* | 6/2010 | Capewell et al. | 345/426 |
| 2010/0211933 A1* | 8/2010 | Kiel et al. | 717/125 |
| 2011/0154307 A1* | 6/2011 | Upton | 717/146 |

OTHER PUBLICATIONS

Moya et al., "Shader Performance Analysis on a Modern GPU Architecture", 2005 IEEE, pp. 1-10 <http://ieeexplore.ieee.org/stamp/stamp.jsp?tp=&arnumber=1540973>.* gDEBugger, graphicREMEDY, http://www.gremedy.com, 2007, retrieved on Aug. 18, 2008.

Duca et al., "A Relational Debugging Engine for the Graphics Pipeline," International Conference on Computer Graphics and Interactive Techniques, ACM SIGGRAPH 2005, pp. 453-463, ISSN: 0730-0301.

Metso Automation, "maxVUE Graphics Editor", 2005, pp. 1-6. http://www.metsoautomation.com/automation/indes.nsf/FR/Readform&ATL=automation/ed_prod.nsf/WebWID/WTB-041110-22256F-2445A; eHB.

"ATI RADEON X800, 3D Architecture White Paper", ATI, 2005, pp. 1-13, with proof of seniority (4 pages). according to ACM bibliography regarding the document: "The Direct3D 10 System", ACM TOG, vol. 25, Iss. 3 (Jul. 2006), Reference 1; eHG.

N. Tatarchuk, "New RenderMonkey Features for DirectX and OpenGL Shader Development", Game Developers Conference, Mar. 2004.

Office Action, U.S. Appl. No. 1/498,203 dated May 25, 2011.
Office Action, U.S. Appl. No. 11/498,203 dated Jun. 22, 2010.
Office Action, U.S. Appl. No. 11/498,207 dated Mar. 16, 2011.
Office Action, U.S. Appl. No. 11/498,207 dated Apr. 27, 2010.
Office Action, U.S. Appl. No. 11/498,207 dated Nov. 12, 2008.
Office Action, U.S. Appl. No. 11/498,207 dated Dec. 10, 2009.

* cited by examiner

US 8,296,738 B1

METHODS AND SYSTEMS FOR IN-PLACE SHADER DEBUGGING AND PERFORMANCE TUNING

BACKGROUND OF THE INVENTION

1. Field of the Invention

Embodiments of the present invention generally relate to software graphics applications and, more specifically, to methods and systems for in-place shader debugging and performance tuning.

2. Description of the Related Art

As is well-known, graphics applications usually include many different shading programs (referred to herein as "shaders"). Software developers commonly encounter situations where individual shaders must be modified in order to eliminate programming bugs or improve application performance. A typical cycle for debugging an application starts with a developer compiling and running the application and looking for anomalies as the application runs. One type of anomaly may be a visual anomaly, such as when the armor of a knight being rendered is not shiny enough. Another type of anomaly may be a performance anomaly, such as a low frame rendering rate. Once an anomaly is detected, the developer typically exits the application, attempts to identify the error in the shader code, makes appropriate modifications to the shader code, re-compiles the application, and then runs the application again to see if the modifications to the shader code fixed the anomaly.

One problem with this cycle is that, even for moderately sized applications, the turn-around time associated with exiting the application, making modifications to the shader code, re-compiling the application, and then running the application again from the beginning may take a significant amount of time. For example, the process of re-compiling the application alone may take from several minutes to several hours. Another problem is that identifying the part of the shader code responsible for the observed anomaly may be a daunting task because of the large number of frames and the large number of shaders associated with the application. Furthermore, after making the modifications to the shader code and re-compiling the application, the developer must be able to reproduce the original conditions, such as a specific location, camera angle, and setting within a game sequence, used to identify the visual anomaly well enough to determine whether the shader code modifications fixed the anomaly.

As the foregoing illustrates, what is needed in the art is a more efficient technique for shader debugging and performance tuning.

SUMMARY OF THE INVENTION

One embodiment of the present invention sets forth a method for managing shader code in a graphics system. The method includes the steps of intercepting a source code version of a shader that is in route to an application programming interface (API) for compiling, generating a copy of the shader source code, intercepting a handle to a machine code version of the shader that is in route to an application, generating a copy of the handle, and associating the copy of the handle with the copy of the shader source code.

One advantage of the disclosed method is that by including an interception layer between the software application and the API, modifications to shader source code may be made without having to exit the application and to recompile the entire application. In one implementation, for each object in the frame, the interception layer makes shader source code available to the developer for modifications, so that the developer may simply pause the application, modify the source code as needed, re-compile only the modified shader source code, and un-pause the application. As a result, shader debugging and performance tuning may be carried out in a manner that is more efficient and effective relative to prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
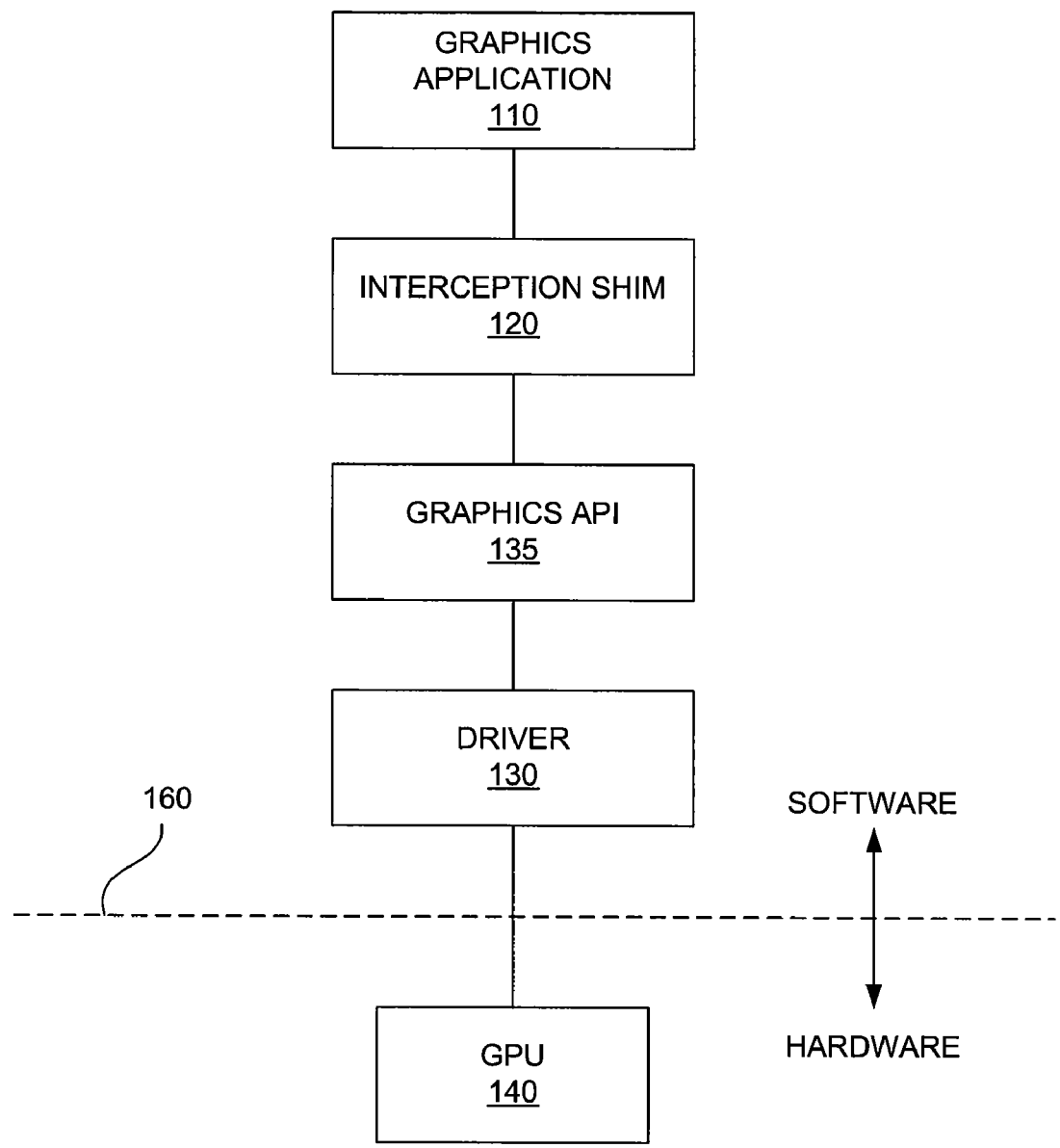
FIG. 1 is a conceptual illustration of a system configured for identifying and editing shader source code, according to one embodiment of the present invention.

FIG. 1 is a conceptual illustration of a system 100 configured for identifying and editing shader source code, according to one embodiment of the present invention. As shown, the system 100 includes, without limitation, a graphics application 110, an interception shim 120, a graphics application programming interface (API) 135, a driver 130, a graphics processing unit (GPU) 140, and a central processing unit (not shown) connected to the GPU 140. In general, the graphics application 110, the API 135 and the driver 130 are implemented in software and execute on the central processing unit (CPU), and the GPU 140 and the CPU are implemented in hardware.

The graphics application 110 typically includes multiple shaders configured to perform specific types of graphics rendering tasks, such as those defined by the API 135. One well-known graphics task defined by the API 135 is the "draw call" operation. In order to execute the various shaders included in the graphics application 110, for each shader, the graphics application 110 transmits the shader source code to the API 135 to be compiled. The API 135, in conjunction with the driver 130, compiles the shader source code and passes a handle corresponding to the machine code version of the shader back to the graphics application 110. In addition, the driver 130 passes the machine code version of the shader to the GPU 140 for storage until execution at a later time.

As set forth in FIGS. 2 and 3 below, the interception shim 120 is configured to store source code versions of the original shaders included in the graphics application 110 as well as corresponding handles to the API handles of the original shaders stored in the driver 130, referencing machine code versions stored in the GPU 140. The interception shim 120 is further configured to enable a developer to modify the source code of one or more of the original shaders. If such modifications are made, the source code versions of the modified shaders are stored in the interception shim along with corresponding handles to the driver versions of the modified shaders stored in the driver 130, referencing machine code programs stored in the GPU 140. When executing the graphics application 110 after such modifications are made, the developer can select whether to implement the original shaders included in the graphics application 110 or the modified shaders. For a given selection by the developer, the interception shim is configured to pass either the API handle to the original shader or the API handle to the modified shader to the API 135 so that the selected machine code version of the shader can be executed on the GPU 140.

Figure 2:
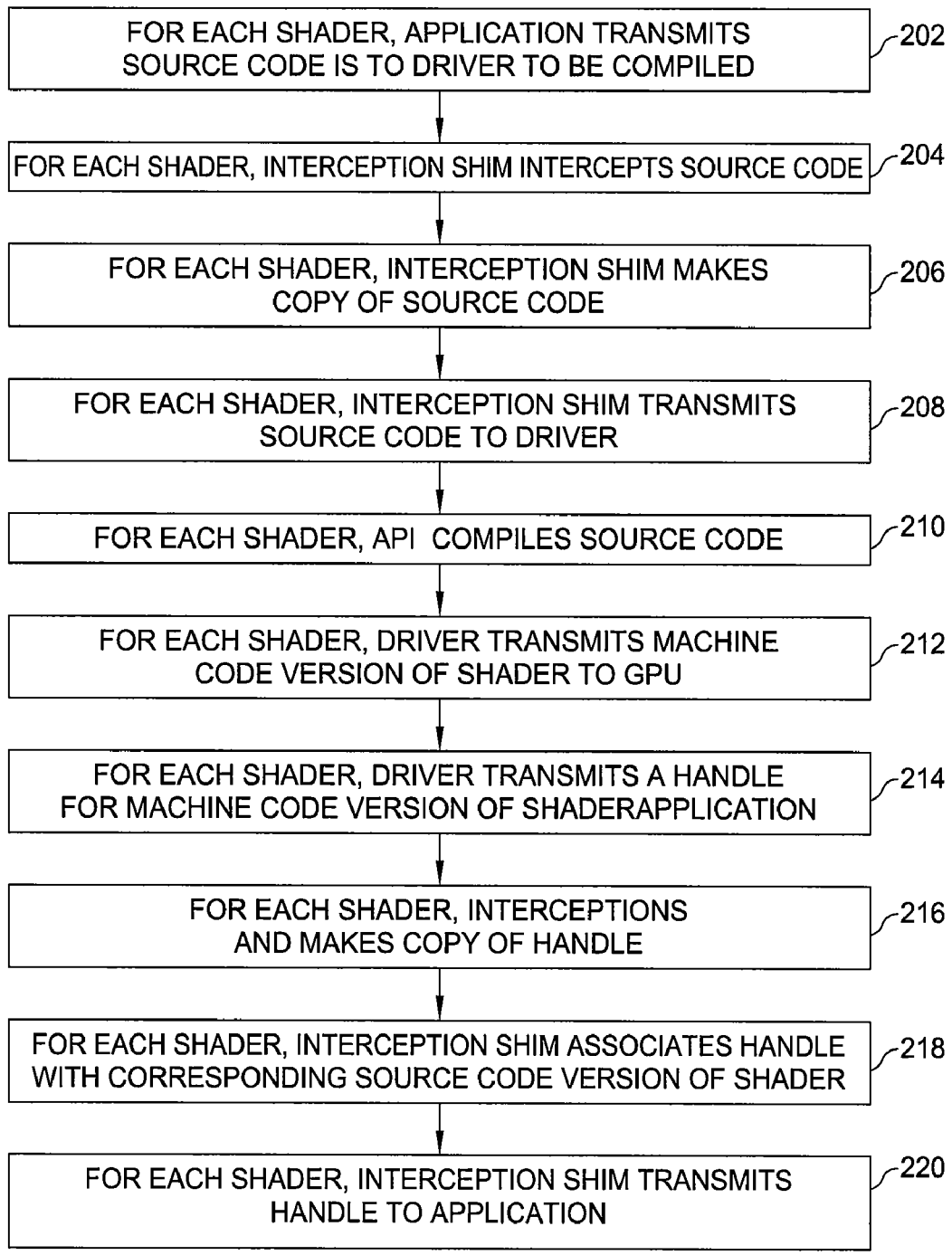
FIG. 2 sets forth a flow diagram of method steps for copying shader source code into an interception shim, according to one embodiment of the present invention.

FIG. 2 sets forth a flow diagram of method steps for copying shader source code into an interception shim, according to one embodiment of the present invention. Although the method steps are described in conjunction with the system 100 of FIG. 1, persons skilled in the art will understand that any system that performs the method steps, in any order, is within the scope of the invention.

The method begins in step 202, where for each shader included in the graphics application 110, the graphics application 110 transmits the shader source code to the API 135 to be compiled, in conjunction with the driver 130. In step 204, for each shader, the interception shim 204 intercepts the shader source code. In step 206, for each shader, the interception shim makes a copy of the shader source code. In step 208, for each shader, the interception shim 120 transmits the shader source code to the API 135. In step 210, for each shader, the API 135, in conjunction with the driver 130, compiles the shader source code. In step 212, for each shader, the driver 130 transmits the resulting machine code version of the shader to the GPU 140. In step 214, for each shader, the API 135 transmits a handle corresponding to the machine code version of the shader to the graphics application 110. Persons skilled in the art will recognize that the handles transmitted to the graphics application 110 are the same handles the graphics application 110 may later pass to the driver 130 to call a particular shader for execution. In step 216, for each shader, the interception shim 120 intercepts and makes a copy of the handle. In step 218, for each shader, the interception shim 120 associates the handle with the corresponding source code version of the shader stored in the interception shim 120. Finally, in step 220, for each shader, the interception shim 120 transmits the handle to the graphics application 110.

Figure 3:
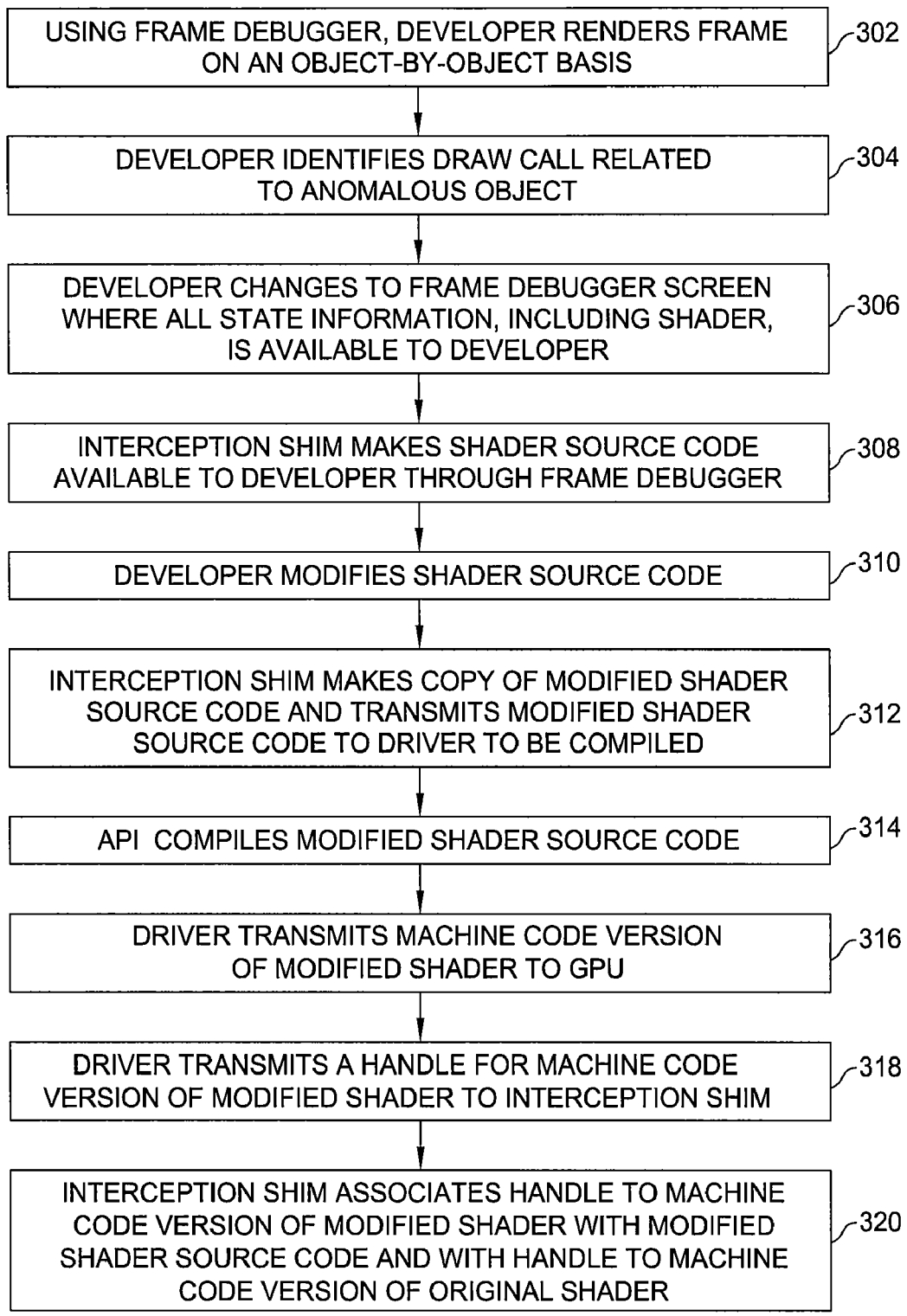
FIG. 3 sets forth a flow diagram of method steps for modifying shader source code, according to one embodiment of the present invention.

FIG. 3 sets forth a flow diagram of method steps for modifying shader source code, according to one embodiment of the present invention. Again, although the method steps are described in conjunction with the system 100 of FIG. 1, persons skilled in the art will understand that any system that performs the method steps, in any order, is within the scope of the invention.

The method begins in step 302, where a developer uses a frame debugger included in the interception shim 120 (shown as element 520 in FIG. 5) to render each frame generated by the graphics application 110 on an object-by-object basis, while the graphics application 110 runs on the system 100. The frame debugger allows the developer to scroll through a frame from the first object to the last object, watching as the scene is being constructed. For each object in the frame, the interception shim 120 makes the draw call invoked to render the object available for the developer to view. For example, in one embodiment, the draw calls may be shown to the developer through graphical user interface controls rendered on top of the display frames generated by the graphics application 110.

In step 304, the developer identifies the draw call related to anomalous object. As previously described herein, one type of anomaly may be a visual anomaly detected by the developer (for example, a wrong color of the object). In step 306, the developer changes to the advanced frame debugger screen where state information, including the shader source code, stored in the interception shim 120, is shown to the developer. In step 308, through the frame debugger, the interception shim 120 makes shader source code corresponding to the anomalous object available to the developer for modifications. In an alternative embodiment the interception shim 120 may make the assembly code for the shader available to the developer for modifications.

In step 310, the developer modifies the source code of the shader used to render the anomalous object. In step 312, the interception shim 120 makes a copy of the modified shader source code and transmits the modified shader source code to the API 135 to be compiled. In step 314, the API 135, in conjunction with the driver 130, compiles the modified shader source code. In step 316, the driver 130 transmits the resulting machine code version of the modified shader to the GPU 140. In step 318, the API 135 transmits a handle corresponding to the machine code version of the modified shader to the interception shim 120. In step 320, the interception shim 120 associates the handle to the machine code version of the modified shader with the modified shader source code stored in the interception shim 120 and with the handle to the machine code version of the original shader source code stored in the interception shim 120.

For example, consider the case where the graphics application 110 includes ten shaders. First, the graphics application 110 transmits the source code for each of the ten shaders included in the graphics application 110 to the API 135 to be compiled. As described in FIG. 2, for each shader, the interception shim 120 stores a copy of the shader source code and pairs the source code version of the shader with the handle to the machine code version of the shader. The developer then renders each frame on an object-by-object basis looking for anomalies as the application runs. For the purposes of discussion only, it is assumed that the developer identifies an anomalous object and that shader 3 was used to render that object. Also, it is assumed that the developer modified the source code of shader 3 in an attempt to cure the anomaly, as described in FIG. 3. As a result, the interception shim 120 stores the source code for the original shaders 1-10, the handles to the machine code version of each of the original shaders 1-10, the source code for the modified shader 3, and the handle to the machine code version of the modified shader 3. More specifically, the interception shim 120 associates the handle to the machine code version of the modified shader 3 with the source code of the modified shader 3 as well as with the handle to the machine code of the original shader 3, which is associated with the source code of the original shader 3.

In one embodiment, the interception shim 120 allows the developer to switch between rendering an object using the original shader and rendering an object using the modified shader to allow the developer to see the effect modifications to a particular shader have on the rendered object. Furthermore, the interception shim 120 allows the developer to switch and compare rendering output and performance-related statistics for a frame rendered using the original shader and a frame rendered using the modified shader. The interception shim 120 then provides the developer with an option to select whether to use the original or the modified shader when rendering the frames generated by the graphics application 110.

Figure 4:
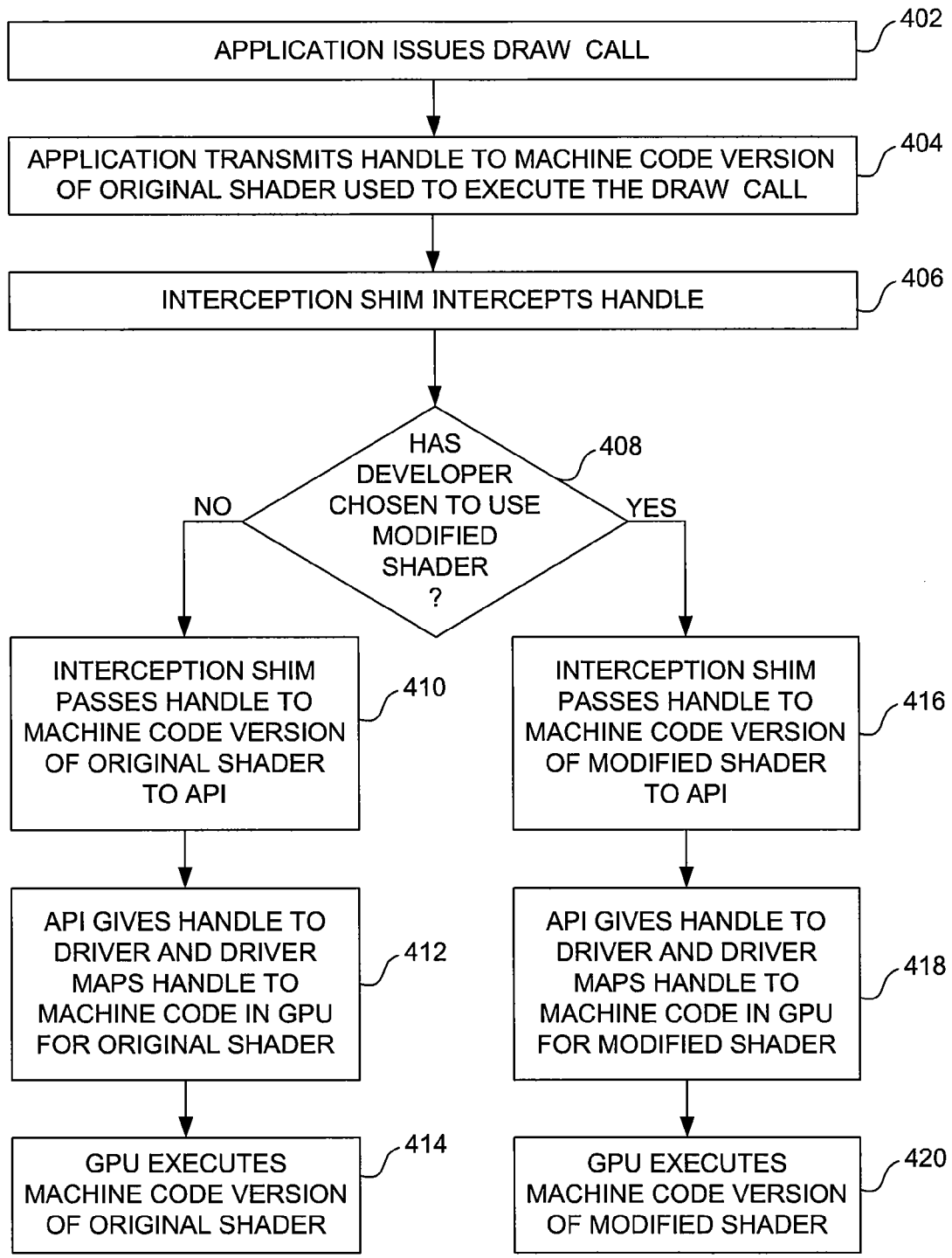
FIG. 4 sets forth a flow diagram of method steps for using modified shader source code to evaluate rendering performance, according to one embodiment of the present invention.

FIG. 4 sets forth a flow diagram of method steps for using modified shader source code to evaluate rendering performance, according to one embodiment of the present invention. Again, although the method steps are described in conjunction with the system 100 of FIG. 1, persons skilled in the art will understand that any system that performs the method steps, in any order, is within the scope of the invention.

The method begins in step 402, where the graphics application 110 issues a draw call to render a particular object in a given frame generated by the graphics application 110. In step 404, the graphics application 110 transmits the handle to the machine code version of the original shader used to execute the draw call to the API 135. In step 406, the interception shim 120 intercepts the handle. In step 408, the interception shim 120 determines whether the developer has chosen to use the original or modified version of the shader. If the developer has chosen to use the original shader, then, in step 410, the interception shim 120 simply passes the handle to the machine code version of the original shader to the API 135. In step 412, the API 135 sends the handle to the driver 130 where the driver 130 maps the handle to the machine code version of the original shader stored in the GPU 140. In step 414, the GPU 140 executes the machine code version of the original shader to render the object.

If, however, in step 408, the interception shim 408 determines that the developer has chosen to use the modified shader, then, in step 416, the interception shim 120 passes the handle to the machine code version of the modified shader to the API 135. In step 418, the API 135 sends the handle to the driver 130 and the driver 130 maps the handle to the machine code version of the modified shader stored in the GPU 140. In step 420, the GPU 140 executes the machine code version of the modified shader to render the object.

Figure 5:
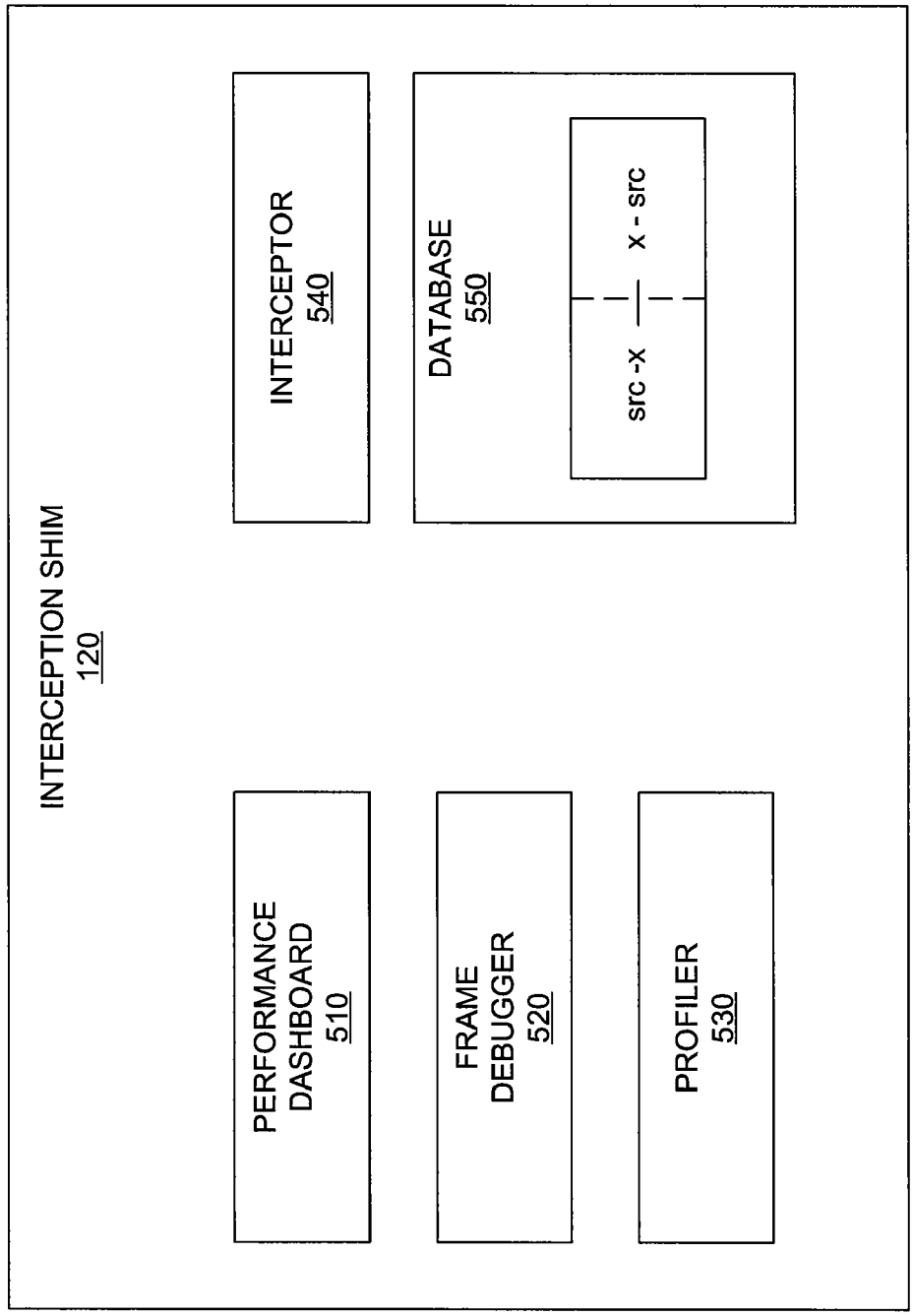
FIG. 5 is a conceptual illustration of the interception shim of FIG. 1, according to one embodiment of the present invention.

FIG. 5 is a conceptual illustration of the interception shim 120 of FIG. 1, according to one embodiment of the present invention. As shown, the interception shim 120 includes, without limitation, a performance dashboard 510, a frame debugger 520, a profiler 530, an interceptor 540, and a database 550. The performance dashboard 510 calculates and displays statistics related to the performance of the GPU 140 and Driver 130 in executing draw calls issued by the graphics application 110, and the profiler 530 calculates and displays frame-related GPU 140 statistics. The frame debugger 520 allows the developer to render frames on an object-by-object basis, pause and continue running the application, and display all state information associated with a particular frame as well as the shader source code stored in the interception shim 120 used to render a given object in the frame. In addition, all of the modes (the Performance Dashboard 510, the Frame Debugger 520, and the Profiler 120) allow the developer to toggle back and forth between the original and the modified shaders and to select which to use when rendering the frames generated by the graphics application 110 (as indicated in step 408 of FIG. 4). The interceptor 540 intercepts the handles and the shader source code transmitted between the graphics application 110 and the API 135. Finally, the database 550 is configured to store copies of the source code for the original shaders, handles to the machine code versions of the original shaders, copies of the source code for the modified shaders, and handles to the machine code versions of the modified shaders.

More details regarding the functionality of the performance dashboard 510, the frame debugger 520, and the profiler 530 are described in the related U.S. patent application titled, "A Method and System for Debugging a Graphics Pipeline Subunit," filed on Aug. 1, 2006 and having Ser. No. 11/498,203, the related U.S. patent application titled, "User Interface and Method for Graphical Processing Analysis," filed on Aug. 1, 2006 and having Ser. No. 11/498,207, and the related U.S. patent application titled, "A Method and System for Calculating Performance Parameters for a Processor," filed on Aug. 1, 2006 and having Ser. No. 11/497,863. These related patent applications are hereby incorporated herein by reference.

In the embodiments illustrated above, the anomalous objects have been considered to have a visual anomaly for the purpose of discussion. As previously described herein, another type of anomaly may be a performance anomaly related to the performance of the GPU 140. In one embodiment, the interception shim 120 includes a profiler 530 configured to calculate and display frame-related performance statistics, such as, for example, frame rate, GPU bottleneck and utilization information, and so forth. Furthermore, the interception shim 120 further includes a performance dashboard (shown as element 510 in FIG. 5) configured to calculate and display real-time performance statistics of the GPU 140 and Driver 130, such as frame rate, pixel rendering rate, frequency of API calls, memory utilization, driver overhead, etc. Using the performance dashboard and the profiler, the developer may run performance analysis on a given frame generated by the graphics application 110 and then identify a particular draw call as the one causing the performance anomaly. For example, the developer may identify a draw call that requires excessive amount of time to render a particular object, thereby decreasing the frame rate. The developer may then modify the source code of the shader used to execute the draw call in an attempt to cure the anomaly, as described in FIG. 3. As also previously described, the interception shim 120 allows the developer to compare frame- and performance-related statistics by switching between rendering an object using the original shader and rendering an object using the modified shader. Thus, after making the modifications, the developer may render the frame using the modified shader to render the anomalous object to see if there is any impact on the frame rate. Using the frame rate readout in the performance dashboard, the developer determines at a glance if the modifications have indeed improved performance. Finally, the developer can re-run profiling in order to further confirm that the modifications relieve previous performance bottlenecks in the GPU 140 associated with executing the draw call.

Figure 6:
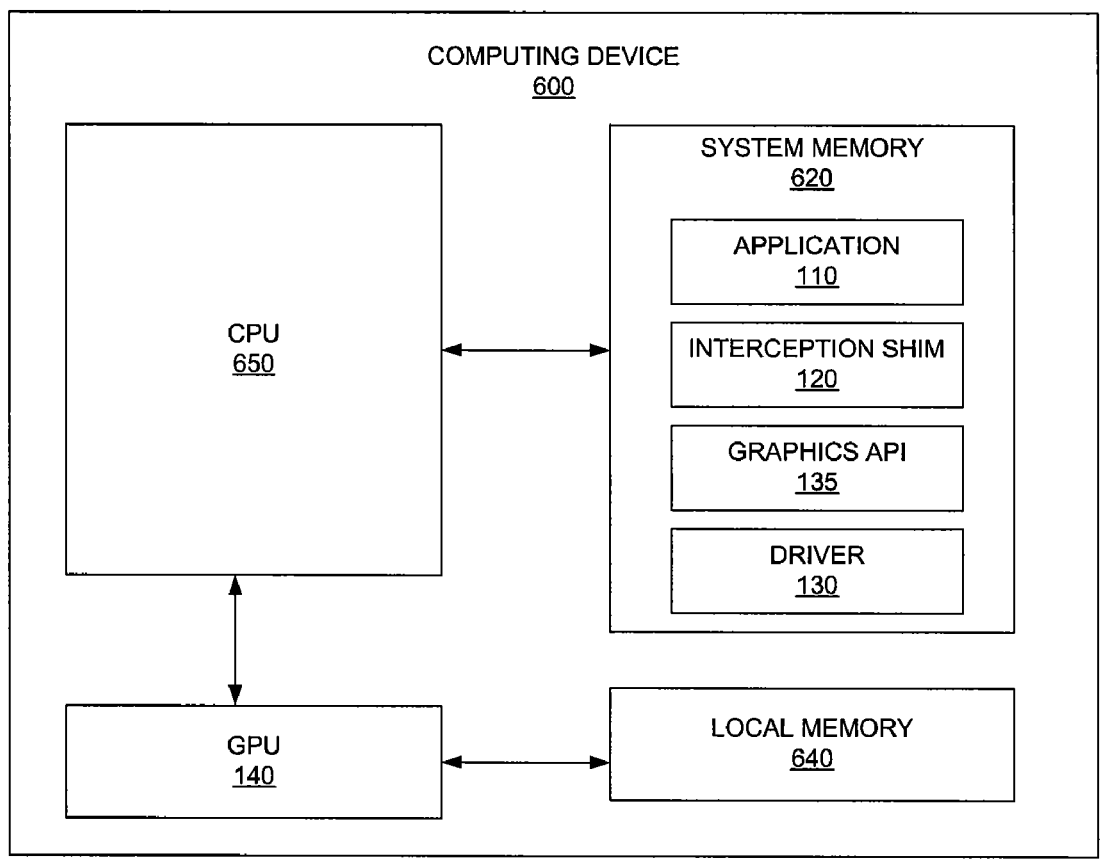
FIG. 6 is a conceptual illustration of a computing device configured to implement one or more aspects of the present invention.

FIG. 6 is a conceptual illustration of a computing device 600 configured to implement one or more aspects of the present invention. As shown, the computing device 600 includes the GPU 140 connected to a CPU 650 and to a local memory 640. In addition, the computing device 600 includes a system memory 620 connected to the CPU 650. The system memory 620 includes the graphics application 110, the interception shim 120, the API 135 and the driver 130. Computing device 600 provides the execution platform for implementing hardware-based and software-based functionality described herein.

In one embodiment of the present invention, the computing device 600 may be implemented as a desktop computer system or server computer system. Alternatively, the computer device 600 may be implemented as a set-top video game console device such as, for example, the Xbox 360™, available from Microsoft Corporation of Redmond, Wash., or the Playstation® 3 available from Sony Computer Entertainment Corporation of Tokyo, Japan. Further, the computer device 600 may be implemented as a portable computing system such as a laptop computer, personal digital assistant (PDA), cellular phone, etc.

Although the computer device 600 is depicted in FIG. 6 with certain components to simplify the discussion, it should be understood that the computer device 600 may comprise additional and/or alternative components, devices, buses, etc. in other embodiments. Additionally, it should be appreciated that elements of the computer device 600 may be alternatively grouped. Furthermore, although elements of the computer device 600 are depicted as discrete components in FIG. 6, it should be appreciated that they may be alternatively implemented as discrete integrated circuit dies (e.g., mounted directly on the motherboard, graphics card, etc.), or as components included within the integrated circuit die of a computer system chipset component.

One advantage of the disclosed systems and methods is that by including an interception layer between the software application and the API, modifications to shader source code may be made without having to exit the application and to recompile the entire application. The interception layer is configured to intercept and store source code versions of the original shaders included in the application. For each object in the frame, the interception layer makes shader source code available to the developer for modifications, so that the developer may simply modify the source code as needed, re-compile only the modified shader source code, and run the application. As a result, shader debugging and performance tuning may be carried out in a manner that is more efficient and effective relative to prior art approaches.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In addition, persons skilled in the art will understand that the systems and methods described herein can be extended to multi-GPU systems. In such systems, there can be a separate interception shim for each GPU, or a given interception shim can be configured to interact with multiple GPUs.

Therefore, the scope of the present invention is determined by the claims that follow.

We claim:

1. A method executed by one or more hardware processing units for managing shader code in a graphics system, the method comprising:

intercepting a source code version of a shader that is in route to an application programming interface (API) for compiling;

generating a copy of the source code version of the shader;

transmitting the source code version of the shader to the API;

intercepting a handle to a machine code version of the shader that is in route to an application;

generating a copy of the handle; and associating the copy of the handle with the copy of the shader source code, wherein the shader is a graphics shading program configured to be executed by the graphics system.

2. The method of claim 1, further comprising the step of compiling the source code version of the shader to produce the machine code version of the shader.

3. The method of claim 2, further comprising the step of transmitting the handle to the machine code version of the shader to the application.

4. The method of claim 3, further comprising the step of transmitting the machine code version of the shader to a graphics processing unit for storage and execution.

5. The method of claim 1, wherein the steps of intercepting the source code version of the shader, generating a copy of the shader source code, transmitting the source code version of the shader to the API, intercepting a handle to the machine code version of the shader, generating a copy of the handle, and associating the copy of the handle are performed for each shader included in a graphics application.

6. The method of claim 1, further comprising the step of intercepting the handle to the machine code version of the shader when in route to a driver for a graphics processing unit.

7. The method of claim 6, further comprising the step of determining that a modified version of the shader is not to be used in rendering a graphics frame.

8. The method of claim 7, further comprising the step of passing the handle to the machine code version of the shader to the driver.

9. The method of claim 1, wherein the API is included within a driver for a graphics processing unit.

10. A non-transitory computer-readable medium including instructions that, when executed by a processing unit, cause the processing unit to manage shader code in a graphics system, by performing the steps of:

intercepting a source code version of a shader that is in route to an application programming interface (API) for compiling;

generating a copy of the source code version of the shader;

transmitting the source code version of the shader to the API;

intercepting a handle to a machine code version of the shader that is in route to an application;

generating a copy of the handle; and associating the copy of the handle with the copy of the shader source code, wherein the shader is a graphics shading program configured to be executed by the graphics system.

11. The computer-readable medium of claim 10, further comprising the step of transmitting the handle to the machine code version of the shader to the application.

12. The computer-readable medium of claim 10, wherein the steps of intercepting the source code version of the shader, generating a copy of the shader source code, transmitting the source code version of the shader to the API, intercepting a handle to the machine code version of the shader, generating a copy of the handle, and associating the copy of the handle are performed for each shader included in a graphics application.

13. The computer-readable medium of claim 10, further comprising the step of intercepting the handle to the machine code version of the shader when in route to a driver for a graphics processing unit.

14. The computer-readable medium of claim 13, further comprising the step of determining that a modified version of the shader is not to be used in rendering a graphics frame.

15. The computer-readable medium of claim 14, further comprising the step of passing the handle to the machine code version of the shader to the driver.

16. A computing device having one or more hardware processing units configured for managing shader code in a graphics system, the computing device comprising:
   a graphics application executing on a first processing unit and including a shader; an application programming interface (API) executing on the first processing unit;
   a second processing unit coupled to the first processing unit; and
   an interception shim executing on the first processing unit that is configured to:
      intercept a source code version of the shader that is in route to the API for compiling,
      generate a copy of the source code version of the shader,
      transmit the source code version of the shader to the API,
      intercept a handle to a machine code version of the shader that is in route to the graphics application,
      generate a copy of the handle, and
      associate the copy of the handle with the copy of the shader source code,
   wherein the shader is a graphics shading program configured to be executed by the graphics system.

17. The computing device of claim 16, wherein the API is configured to compile the source code version of the shader to produce the machine code version of the shader, and to transmit the handle to the machine code version of the shader to the graphics application.

18. The computing device of claim 17, wherein the first processing unit comprises a central processing unit, the second processing unit comprises a graphics processing unit, and the API is included within a driver for the graphics processing unit.

19. A method executed by one or more hardware processing units for managing shader code in a graphics system, the method comprising:
   intercepting a source code version of a shader that is in route to an application programming interface (API) for compiling;
   generating a copy of the source code version of the shader;
   transmitting the source code version of the shader to the API;
   compiling the source code version of the shader, which generates a machine code version of the shader;
   intercepting a handle to the machine code version of the shader that is in route to a graphics application;
   generating a copy of the handle;
   associating the copy of the handle with the copy of the source code version of the shader;
   intercepting the handle to the machine code version of the shader when in route to a driver for a graphics processing unit; and
   determining that a source code version of a modified shader is to be used in rendering a graphics frame instead of the source code version of the shader,
   wherein the shader is a graphics shading program configured to be executed by the graphics system.

20. The method of claim 19, further comprising the steps of:
   compiling the source code version of the modified shader, which generates a machine code version of the modified shader; and
   passing a handle to the machine code version of the modified shader to the driver.

21. A non-transitory computer-readable medium including instructions that, when executed by a processing unit, cause the processing unit to manage shader code in a graphics system, by performing the steps of:
   intercepting a source code version of a shader that is in route to an application programming interface (API) for compiling;
   generating a copy of the source code version of the shader;
   transmitting the source code version of the shader to the API;
   intercepting a handle to a machine code version of the shader that is in route to a graphics application;
   generating a copy of the handle;
   associating the copy of the handle with the copy of the source code version of the shader;
   intercepting the handle to the machine code version of the shader when in route to a driver for a graphics processing unit; and
   determining that a source code version of a modified shader is to be used in rendering a graphics frame instead of the source code version of the shader,
   wherein the shader is a graphics shading program configured to be executed by the graphics system.

22. The computer-readable medium of claim 21, further comprising the steps of:
   compiling the source code version of the modified shader, which generates a machine code version of the modified shader; and
   passing a handle to the machine code version of the modified shader to the driver.

* * * * *